Feb. 16, 1932.    K. SCHMIDT    1,845,446
SPARE TIRE LOCK
Filed March 8, 1929
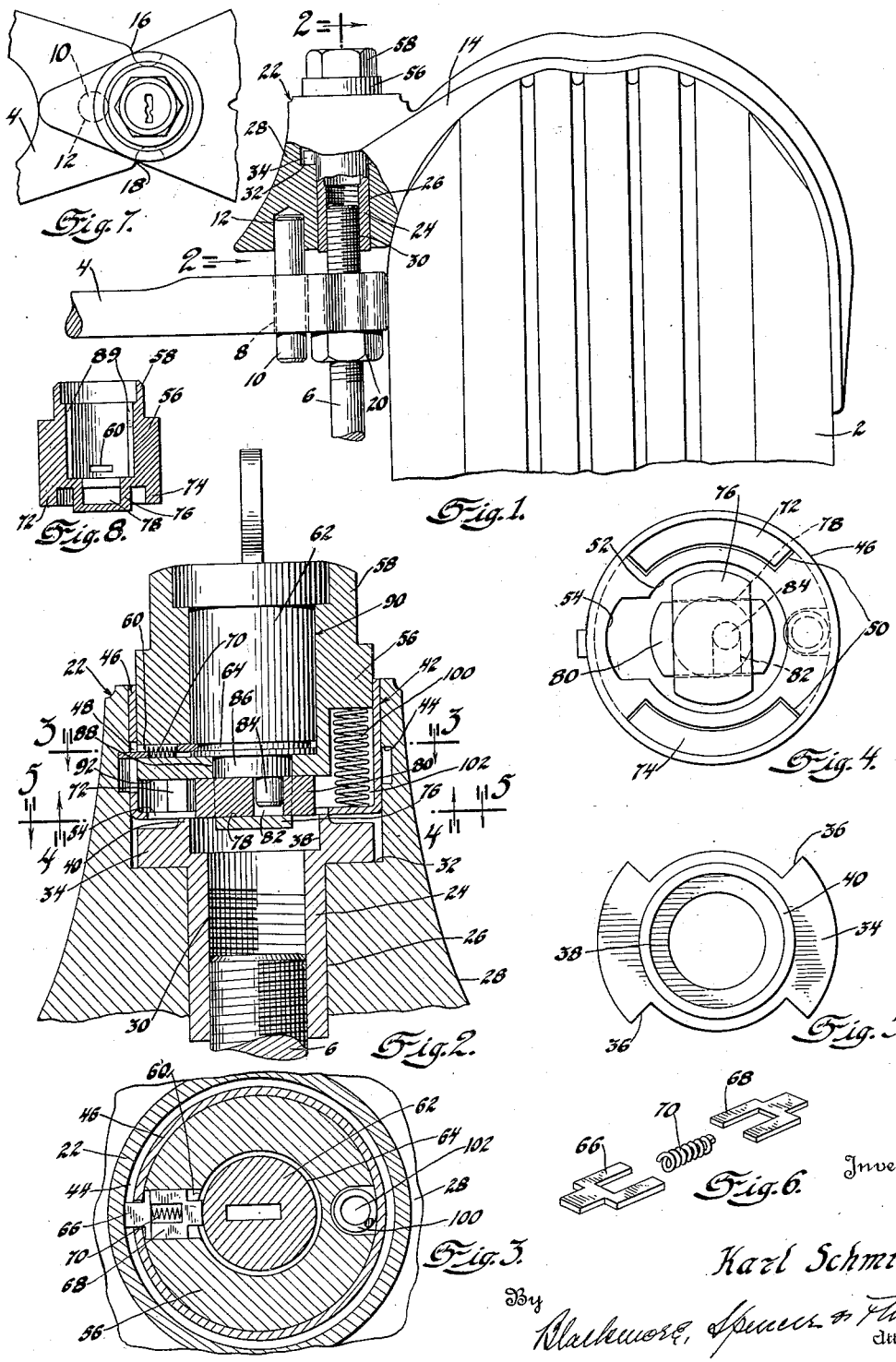
Inventor
Karl Schmidt
By Blackmore, Spencer & Finch
Attorneys Patented Feb. 16, 1932

1,845,446

UNITED STATES PATENT OFFICE

KARL SCHMIDT, OF DETROIT, MICHIGAN, ASSIGNOR TO GENERAL MOTORS RESEARCH CORPORATION, OF DETROIT, MICHIGAN, A CORPORATION OF DELAWARE

SPARE TIRE LOCK

Application filed March 8, 1929. Serial No. 345,328.

This invention relates to locks and has particular reference to the type of lock which is used to secure a spare tire to an automotive vehicle. The invention is particularly adaptable to secure the spare tires which are mounted at the side of the vehicle in a fender well.

Locks of the type to which the invention relates have been positioned at the fender well or at the top of the tire and are usually key operated. The lock controls a nut which when in locked position is rigidly held against rotation but is free to turn when in unlocked position. This prior structure has been objectionable for the reason that when the nut is locked the nut can be forcibly turned by the use of a suitable tool and the lock broken, which will enable the tire to be removed. It is the object of the invention to construct a lock which will permit the free rotation of the nut at all times, but when in locked position the rotation of the nut will have no effect on the other parts of the locking mechanism.

The object of the invention is accomplished by housing or enclosing in the clamp which extends over the tire an internally threaded sleeve or collar which acts as a nut. The sleeve is suitably journalled in the clamp and has a head portion which rests on a shoulder which prevents the removal of the sleeve. The head portion is hollow and has suitable notches or recesses on its edge to permit the engagement of the teeth of a rotatable cage therewith in order that the sleeve or collar may be turned to either engage or disengage the clamp from the usual rod which extends upwardly from the fender well. Journally mounted in the clamp coaxially with the collar are the turnable cup, the rotatable cage having an exposed nut formation, and the lock barrel, all of which are arranged within each other and form parts of the lock mechanism. The lower portion of the cup rests on the head of the cylindrical threaded member and has a lateral opening which conforms to an annular groove in the clamp. The cage has a conformable opening and a slot on the lock barrel likewise mates with the opening and slots described. A pair of lugs or catches spring pressed apart are held in these openings or grooves, the purpose of which is to permit the rotation and partial reciprocation but not withdrawal of the cup, cage, and lock barrel from the clamp. The cage and cup are suitably pressed apart by means of a coil spring interposed therebetween. The lower portion of the cage is provided with a pair of teeth or jaws at its sides which are adapted to pass through openings in the bottom of the cup and project into the recesses or cut out portions of the head of the collar or sleeve to engage and rotate the same when the cage is inwardly pressed. The cage is further provided with a concentric extension having an opening and in this opening there is adapted to slide a locking lug which is operated by an eccentric pin on the end of the rotatable lock barrel. The lug is adapted to be shifted to locked position to engage between the cage and head to prevent the reciprocation of the cage and therefore prevent the engagement of the teeth with the notches in the head. When shifted to neutral or unlocked position the lock as well as the extension of the cage are adapted to be received in the hollow head of the collar or sleeve to permit the teeth of the cage to project through the slots in the cup and to engage in the recesses in the head. When the parts are in the locked position, the application of a wrench to the nut portion of the cage will permit its rotation but will have no effect on the internally threaded cylindrical member, neither can the cage be reciprocated.

A bracket or arm usually extends from the vehicle to engage the bolt extending from the running board and on this arm or bracket there is provided a pair of notches at either side of the bolt. These notches are for the purpose of receiving a stud secured to the clamp and normally entering an opening in the arm to assist in rigidly holding the clamp from the tire. When no tire is in the fender well the clamp may be moved to one side or the other and the stud caused to engage in either notch to rigidly hold the clamp in position and out of the way.

Referring to the drawings:

Fig. 1 shows a view of the upper portion of an automobile tire held in a fender well.

Fig. 2 is a section on the line 2—2 of Fig. 1.

Figs. 3, 4 and 5 are sections on the lines 3—3, 4—4 and 5—5 of Fig. 2.

Fig. 6 is the detailed perspective view of the lugs or catches which prevent the withdrawal of the lock mechanism from the clamp.

Fig. 7 is a plan view of the lock mechanism of Fig. 1.

Fig. 8 is a section through the cage.

Referring to the drawings, the numeral 2 indicates the tire of an automotive vehicle which tire is adapted to be positioned in a fender well (not shown). The numeral 4 indicates the arm or bracket which extends from the side of the vehicle and which is adapted to receive the rod 6 in an opening in its end. The rod 6 is rigidly secured at its lower end to the running board or the fender at the fender well. The bracket 4 is provided with an opening 8 adapted to receive the stud 10 rigidly secured as at 12 to the clamp 14 adapted to be engaged over the tire 2. The bracket 4 is provided with the lateral notches 16 and 18 which are adapted to receive the stud 10 when the clamp is swung 90° from the position shown in Fig. 1. The purpose of these notches is to hold the clamp rigidly in position at the side of the vehicle when no tire is in the well. A suitable lock nut 20 is threaded on to the threaded end of the rod 6 to rigidly hold it against the bracket 4.

The locking mechanism of the invention is indicated as a whole at 22 and includes the collar or sleeve 24 journalled as at 26 into the enlarged portion 28 of the clamp 14. The collar 24 is internally threaded as at 30 and is adapted to be engaged with and disengaged from the threaded end of the rod 6. The clamp 14 is provided with the shoulder 32 on which there is adapted to rest the head portion 34 of the collar 24. The head 34 is provided with the notches or recesses 36 (see Fig. 5), the purpose of which will be later described, and is also with the annular upwardly projecting flange 40. The head also is hollow and has an enlarged hollow at its upper portion as indicated at 38.

The upper portion of the enlarged part 28 of the clamp 14 is bored out as indicated at 42, the bore being axially arranged with reference to the axis of the collar 24. An annular groove 44 is provided on the interior of the bore 42 the purpose of which will be later described.

A cup 46 is journalled in the bore 42 and is provided with the lateral opening or slot 48, and the arcuate recesses 50 in its bottom. The arcuate recesses 50 are somewhat larger than the notches 36 in the head 34 and at times are adapted to mate or conform to these notches for a purpose which will be later described.

The bottom of the cup is further provided with the opening 52 which has the lateral recess 54 the purpose of which will be later described.

Journally mounted in the cup 46 is the cage 56 which has the upper nut portion 58 shown as hexagonal and adapted to receive a wrench or suitable tool. The cage 56 is provided with the opening 60 through one wall, which opening is adapted to mate with the opening or slot 48 in the cup 46. The lock barrel 62 is rotatably mounted in the cage 56 and is provided with the annular groove 64 at its lower end. This groove mates with the opening 60 in the cage and slot 48 in the cup. As shown in Fig. 2 and in detail in Fig. 6 a pair of locking lugs or pins 66 and 68 is adapted to be received in the openings 48 and 60 and to be projected away from each other by means of a coil spring 70 held therebetween. The shape of the latches is shown in Fig. 6 and in Fig. 2 they are shown as sliding over each other although if desired they may be placed in end to end relation and pressed apart by the spring 70. The function of the lugs of Fig. 6 is to prevent the withdrawal of the cage 56 and cup 46 from the bore 42 but to permit of their inward movement within the limits allowed by the width of the groove 44.

Referring to Figs. 4 and 8, there are shown at 72 and 74, two teeth or projections which are continuations of the sides of the cage 56 and which are adapted to be pushed downwardly through the openings 50 of the cup 46 and into the recesses 36 of the head 34 when the parts are in unlocked position as shown in Fig. 2. With the parts in the position shown in Fig. 2 the tool applied over the nut 58 may press the nut downwardly and cause the engagement of the teeth 72, 74 with the receses 36 and by turning the tool the collar 24 may then be rotated to be either engaged with or disengaged from the threaded end of the rod 6. The unscrewing of the collar from the bolt 6 will permit the removal of the clamp 14 from the tire 2, and the stud 10 from the opening 8 in bracket 4.

The lower end of the cage 56 is provided with the extension or projection 76 which has a suitable opening 78 in which there is adapted to be received the sliding locking lug or latch 80. The latch 80 has a recess or slot 82 at one side and in this recess or slot there is received the eccentric locking pin 84, on the reduced end 86 of the lock barrel 62. The reduced end 86 is journalled in the opening 88 in the end of the cage 58.

The bore 90 of the cage which receives the lock barrel 62 is provided with a pair of diametrically positioned grooves or slots 89 in which there are adapted to be received the usual locking pins of the lock 62. The insertion of the key in the lock will cause the pins to operate in the usual way so as to permit the rotation of the barrel and the consequent rotation of the eccentric pin 84, which causes the latch or bolt 80 to move from the position shown in Fig. 2 toward the left in the recess 54 and shifts it to a position between the flange 40 on the head 34 and the lower flat portion 92 of the cage 56. When the lug or latch 80 is shifted to the left as described, it will prevent the reciprocation of the cage 56 and thereby prevent the teeth or projections 22 and 24 from engaging in the recesses 36 of the head 34. However, as the cup 46 is rotatable in the bore 42, the application of a tool to the nut 58 will permit the rotation of the nut and cage (the lug or latch sliding on the flange 40) but not its reciprocation and this rotation will have no effect on the collar 24 for the reason that the teeth 72 and 74 are not in engagement with the recesses 36.

With the parts in the position shown in Fig. 2, if it is desired to unscrew the collar 24 from the threaded end of the bolt 6, it is necessary to apply the tool to the nut 58 and press inwardly or downwardly thereon to force the teeth 72 and 74 into engagement with the recesses 36. The openings 50 in the bottom of the cup 46 will at all times conform with the teeth on the cage to permit its reciprocation, however, should the notches 36 of the head 34 not mate with the teeth 72, 74 and openings 50, a rotation of the nut portion 58 though not exceeding a quarter turn will bring them into line. The projections 76 on the end of the cage as well as the latch 80 will be projected downwardly into the hollow 38 of the head 34 of the collar 24 when the cage is reciprocated.

As a result of the invention it will be seen that there has been constructed and arranged a lock having the usual exposed locking nut which may be rotated at all times but will only be effective to rotate the locking collar when the lock is in unlocked position. When the lock is locked the nut may be rotated but it will have no effect on the rotatable collar and the latter cannot therefore be moved to permit release of the tire.

A spring 100 is shown as interposed between the bottom of the cup 46 and the cage 56, a recess 102 being provided in the cage for the reception of the spring. The function of the spring is to at all times urge the cage upward and also to prevent rattle of the parts.

I claim:

1. In a means to secure a tire to a vehicle, a clamp and a rod to secure said tire in position, a member mounted in said clamp and adapted to engage and disengage said rod to hold or release said clamp, a reciprocable and rotatable lock mounted in said clamp and adapted to be reciprocated and rotated in unlocked position to respectively engage and rotate said member into or out of engagement with said rod, and in locked position adapted to be freely rotated but not reciprocated.

2. In a means to secure a tire to a vehicle, a clamp and a rod to secure said tire in position, a member mounted in said clamp and adapted to engage and disengage said rod to hold or release said clamp, a head on said member to hold it in said clamp and having one or more notches, a reciprocable and rotatable lock mechanism adapted in unlocked position to be reciprocated and rotated to respectively engage and rotate said member to cause its engagement or disengagement with said rod, said mechanism in locked position capable of rotation only but incapable of rotating said member.

3. In a means to secure a tire to a vehicle, a clamp and a rod to secure said tire in position, means mounted in said clamp to removably secure said clamp and rod together, a lockable mechanism for moving said means to cause its engagement or disengagement with said rod, said mechanism including a reciprocable member rotatably mounted in said clamp, means on said member to engage with said first named means when said member is reciprocated to cause the operation of the latter by the rotation of the former, and means forming a part of said mechanism and adapted to be interposed between said first two means to prevent the reciprocation but not rotation of said mechanism.

4. In a means to secure a tire to a vehicle, a clamp and a rod to secure said tire in position, a member mounted in the clamp adapted to be engaged with or disengaged from the rod to hold or release the clamp from the rod, a lockable mechanism for preventing the release of or releasing said member from said rod to retain or allow the removal of the tire respectively, said mechanism comprising a rotatable member provided with a shiftable locking lug adapted to be moved between said members to prevent the operation of said first named member.

5. In a tire lock, means to secure the tire including an operable member having a hollow portion, a mounting for said member, a reciprocable cage adapted to operate said member and having an end portion adapted to enter said hollow portion, said end portion having an opening, a locking lug movable in said opening by a key operated lock barrel, said lug adapted to extend between said cage and member to prevent the operation of said member.

6. In a tire lock, means to secure a tire including an operable member held in a mounting and having a hollow portion, a reciprocable cage in said mounting adapted to operate said member and having a lock barrel, an end portion on said member adapted to be received in said hollow portion, a lug operable by said barrel in an opening in said end, said lug adapted to enter said hollow when said cage is reciprocated and to be positioned between said cage and member in locking position to prevent the operation of said member by said cage.

7. In a tire lock, means to secure the tire including an operable member held in a mounting and having a hollow end portion, a reciprocable cage in said mounting and having a lock barrel therein, said cage when reciprocated adapted to engage with cut-out portions on said member to operate the same, an end portion on said cage, a locking lug mounted in an opening in said end portion and adapted to be shifted by said barrel, said lug and end portion adapted to enter said hollow portion when said cage is reciprocated and said lug adapted to be shifted between said cage and member to prevent the reciprocation of the cage and operation of said member.

8. In a means to secure a tire to a vehicle, a clamp and a threaded rod to hold said tire, a hollow internally threaded member rotatably mounted in said clamp and adapted to be engaged with and disengaged from the threaded portion of said rod, a head on said member positioned on a shoulder in said clamp and preventing the removal in one direction of said member from said clamp, a plurality of arcuate recesses in said head, a cage reciprocably and rotatably mounted in said clamp coaxially with said member, a cup between said clamp and cage and rotatable but not reciprocable with said cage, a spring between said cage and cup, a plurality of teeth or projections on said cage adapted to enter said arcuate recesses but normally held therefrom by said spring, an axial end extension on said cage, a locking lug operable in an opening in said extension, a lock barrel in said cage, a lock pin on said barrel engaging in a groove in said lug to operate the same upon rotation of said barrel, said teeth adapted to engage in said recesses, and said extension and lug adapted to enter the hollow of said internally threaded member when said cage is reciprocated to permit the rotation of said member by said cage, said lug also adapted to be moved to extend between said cage and head when in locked position to prevent the reciprocation of the cage and operation of said member, and means to prevent the withdrawal of said cage and cup from said clamp.

In testimony whereof I affix my signature.

KARL SCHMIDT.

CERTIFICATE OF CORRECTION.

Patent No. 1,845,446. Granted February 16, 1932, to

KARL SCHMIDT.

It is hereby certified that error appears in the printed specification of the above numbered patent requiring correction as follows: Page 2, line 107, for the misspelled word "receses" read recesses; page 3, line 31, for "though" read through; same page, strike out lines 95 to 107, comprising claim 4. The claims now appearing in the patent as numbers "5, 6, 7 and 8" should bear the numbers respectively 4, 5, 6 and 7; and that the said Letters Patent should be read with these corrections therein that the same may conform to the record of the case in the Patent Office.

Signed and sealed this 29th day of March, A. D. 1932.

(Seal)

M. J. Moore,
Acting Commissioner of Patents.